(12) United States Patent
Thring et al.

(10) Patent No.: US 10,076,122 B1
(45) Date of Patent: Sep. 18, 2018

(54) SAUSAGE CUTTING APPARATUS

(71) Applicant: Freddy Hirsch Group AG, Hunenberg (CH)

(72) Inventors: Tom Lawrence Thring, Cape Town (ZA); Andries Wynand Van Zyl, Cape Town (ZA); Hermann August Schultz, Cape Town (ZA); Heindrich Fritz, Cape Town (ZA); Johannes Christiaan Du Preez, Kraaifontein (ZA)

(73) Assignee: Freddy Hirsch Group AG, Hunenberg (CH)

(*) Notice: Subject to any disclaimer, the term of this patent is extended or adjusted under 35 U.S.C. 154(b) by 0 days.

(21) Appl. No.: 15/913,668

(22) Filed: Mar. 6, 2018

(30) Foreign Application Priority Data

Mar. 15, 2017 (GB) .................................. 1704151.8

(51) Int. Cl.
| | | |
|---|---|---|
| *A22C 11/00* | (2006.01) | |
| *A22C 11/10* | (2006.01) | |
| *A22C 13/00* | (2006.01) | |
| *A22C 11/02* | (2006.01) | |

(52) U.S. Cl.
CPC .......... *A22C 11/006* (2013.01); *A22C 11/105* (2013.01); *A22C 11/0227* (2013.01); *A22C 2013/0023* (2013.01)

(58) Field of Classification Search
CPC .......... A22C 11/00; A22C 11/02; A22C 11/10
See application file for complete search history.

(56) References Cited

U.S. PATENT DOCUMENTS

| | | | | |
|---|---|---|---|---|
| 6,045,445 A * | 4/2000 | Hummel | .............. | A22C 11/006 452/46 |
| 7,625,266 B2 * | 12/2009 | Bontjer | ................ | A22C 11/006 452/48 |
| 7,972,202 B2 * | 7/2011 | Le Pabic | .............. | A22C 11/006 452/49 |

* cited by examiner

*Primary Examiner* — Richard Thomas Price, Jr.
(74) *Attorney, Agent, or Firm* — Kilpatrick Townsend & Stockton LLP

(57) ABSTRACT

A sausage cutting apparatus 10 for cutting an extruded length of sausage into smaller sausage portions includes first and second cutting assemblies located at opposite sides of a feed path. The cutting assemblies include flexible toothed belts 38 driven by toothed pinions, to which a number of longitudinally-spaced cutting device 30 are fixedly attached. The apparatus includes a drive system for synchronously driving the belts 38 and a guide system for guiding displacement of the cutting devices into and out of meshing engagement with one another for cutting the length of sausage. Each cutting device includes a cutting blade defining a domed cutting face at an inner side thereof. The cutting devices are displaced along arcuate cutter paths during meshing engagement of the cutting blades wherein the cutting faces of opposing pairs of cutting blades mesh with a slight interference fit in a conjugate meshing action.

32 Claims, 19 Drawing Sheets

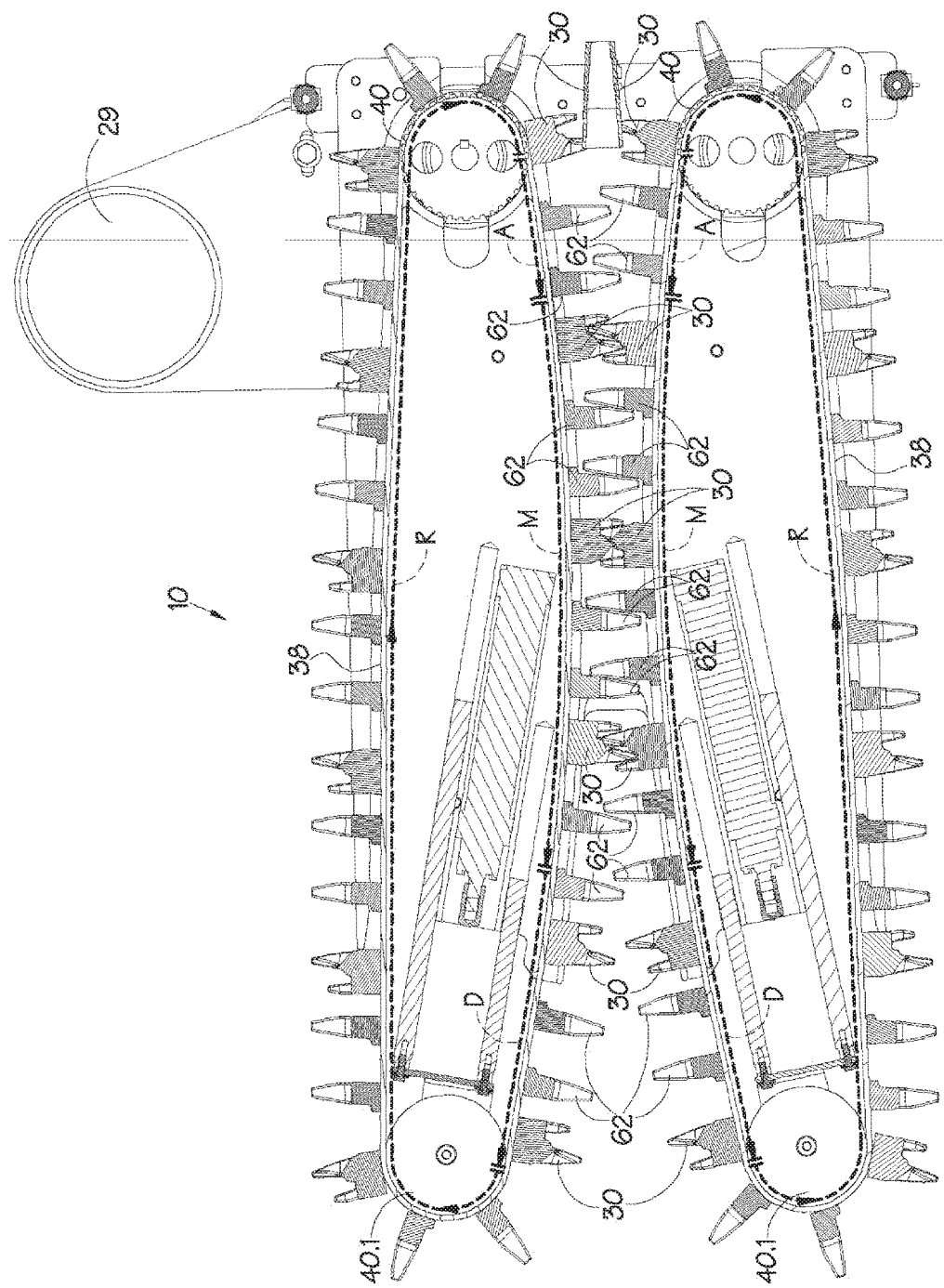

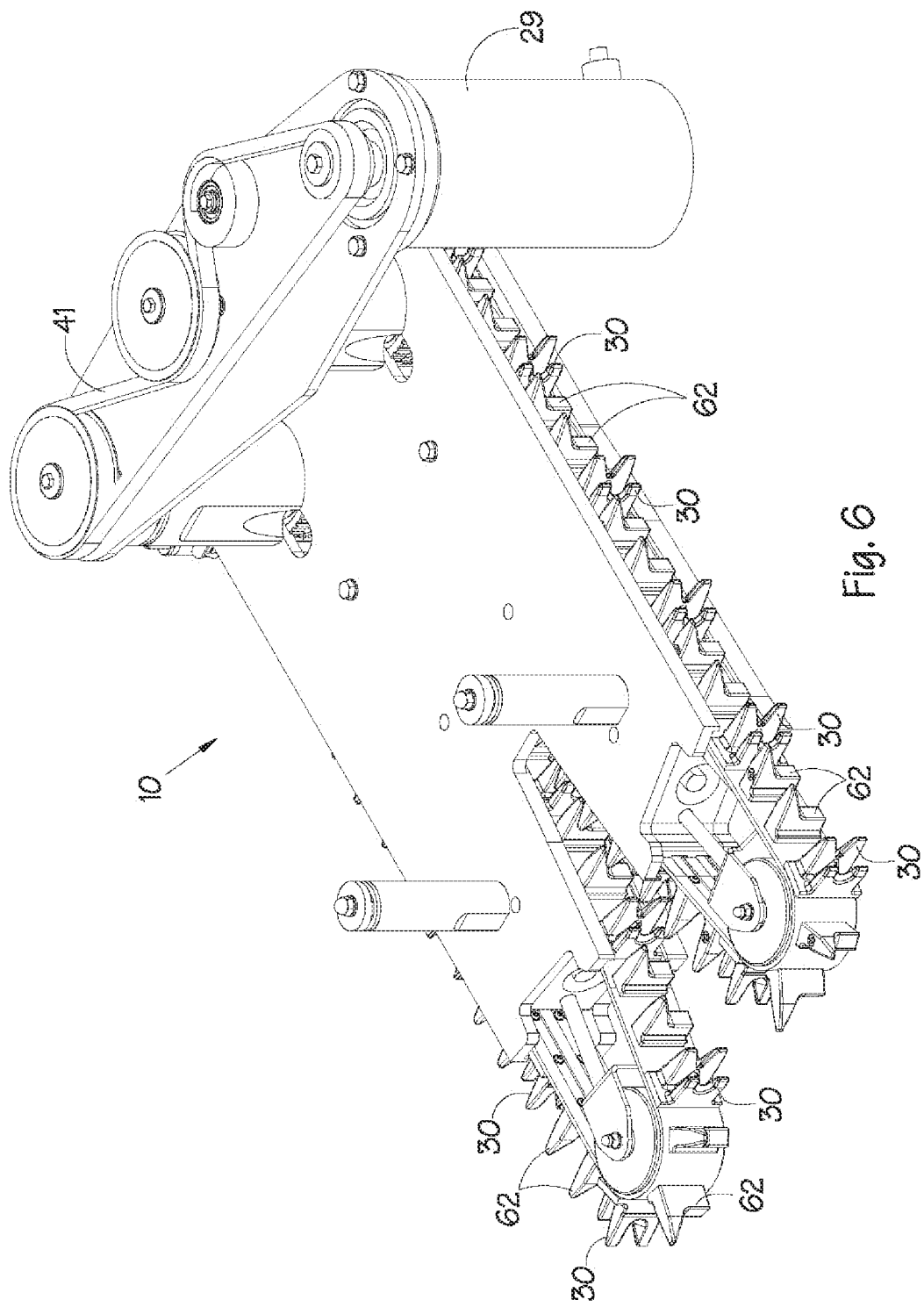

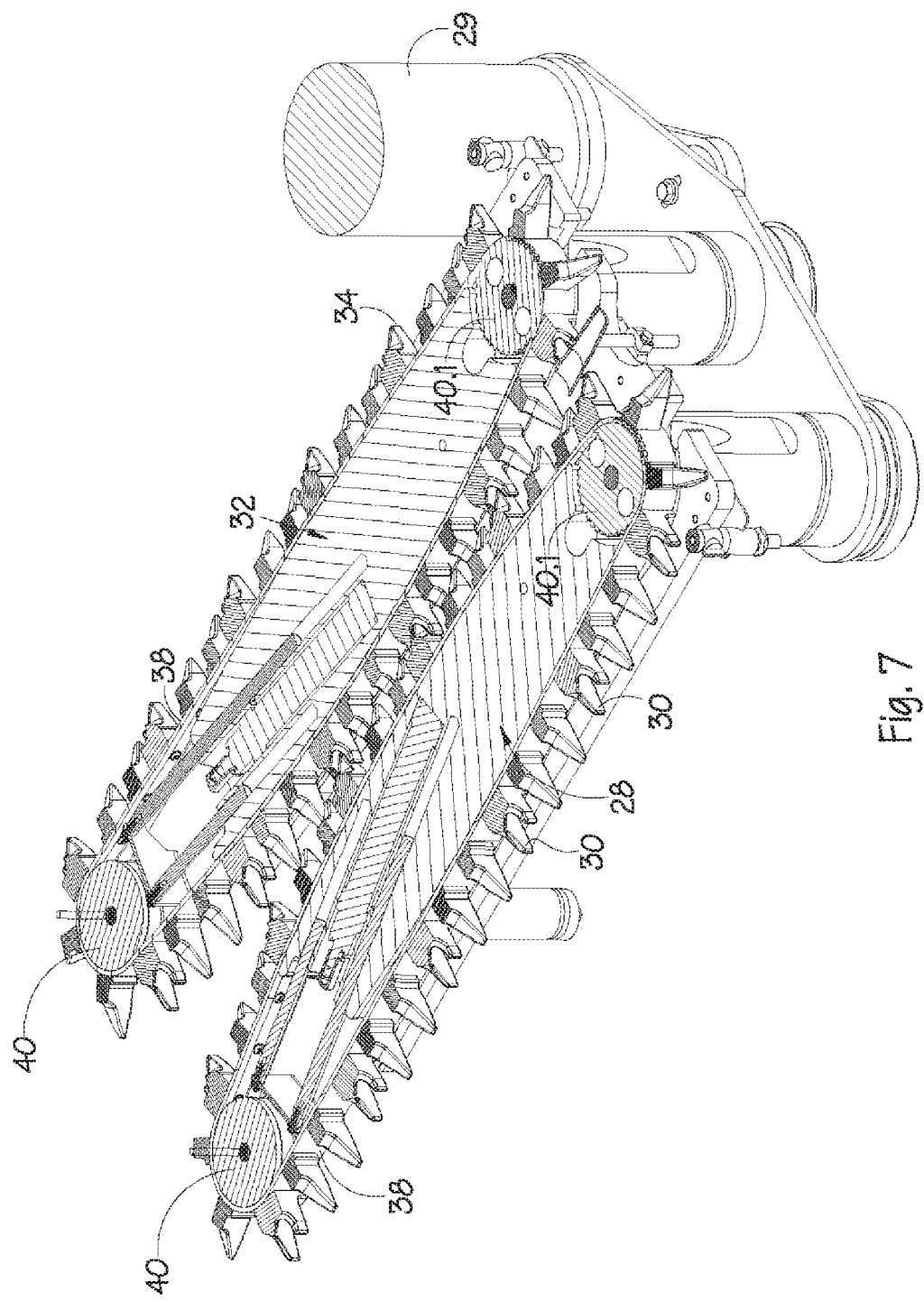

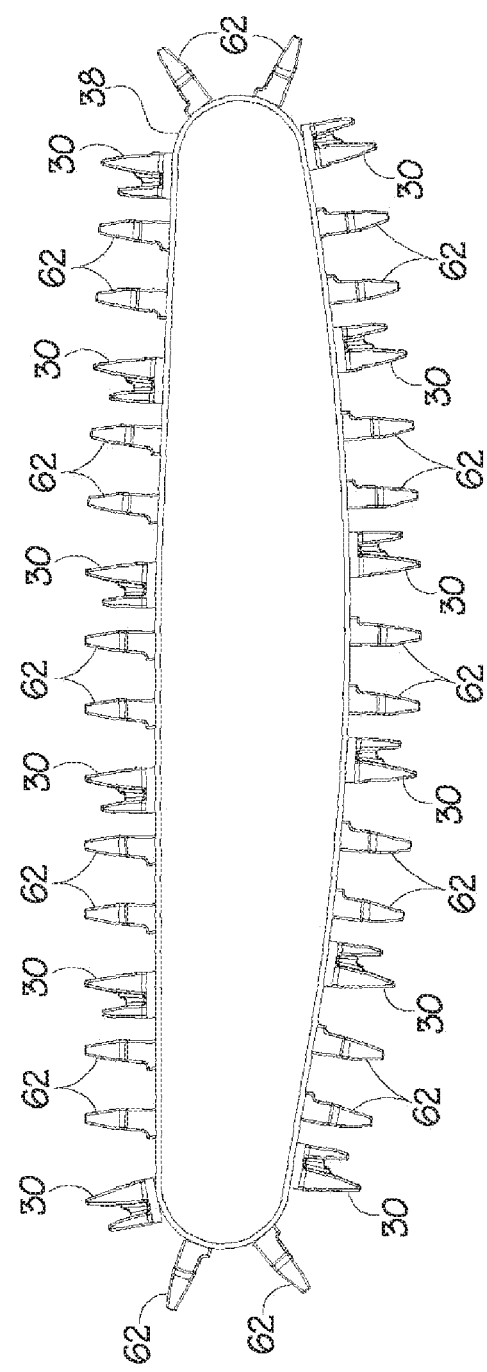

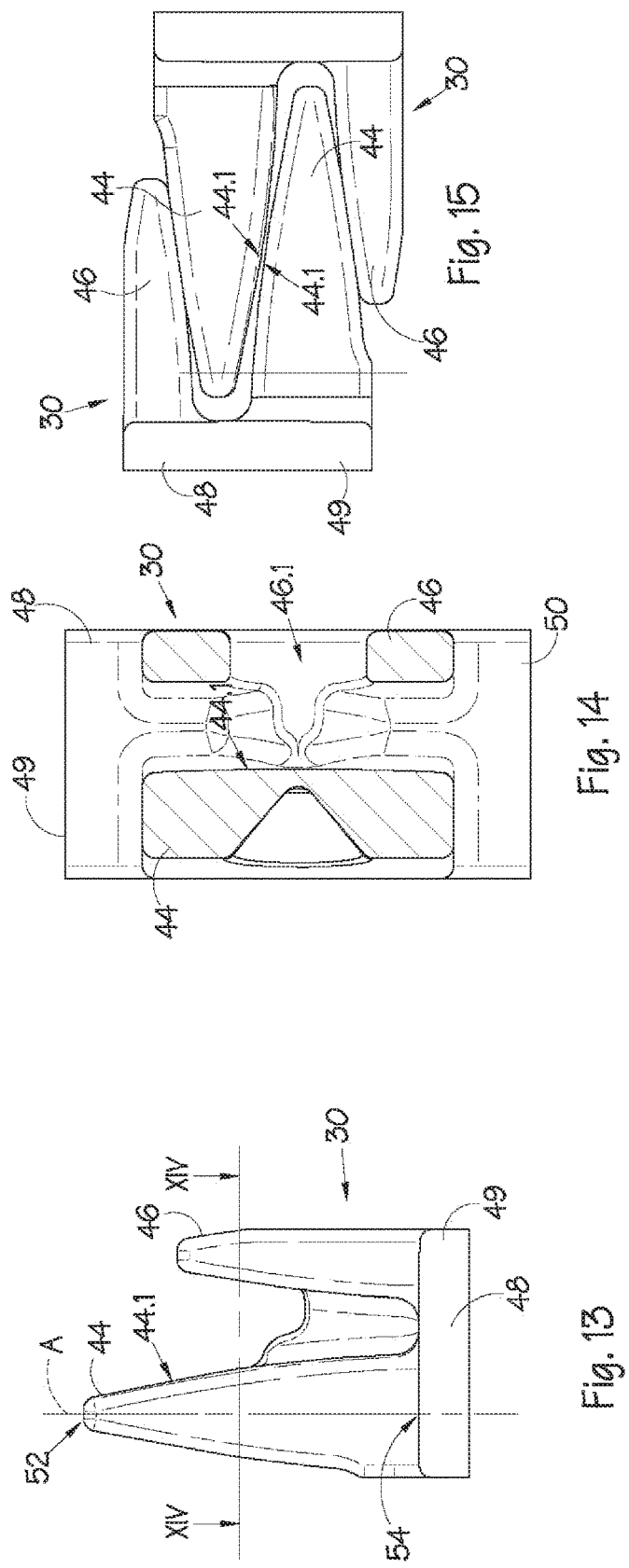

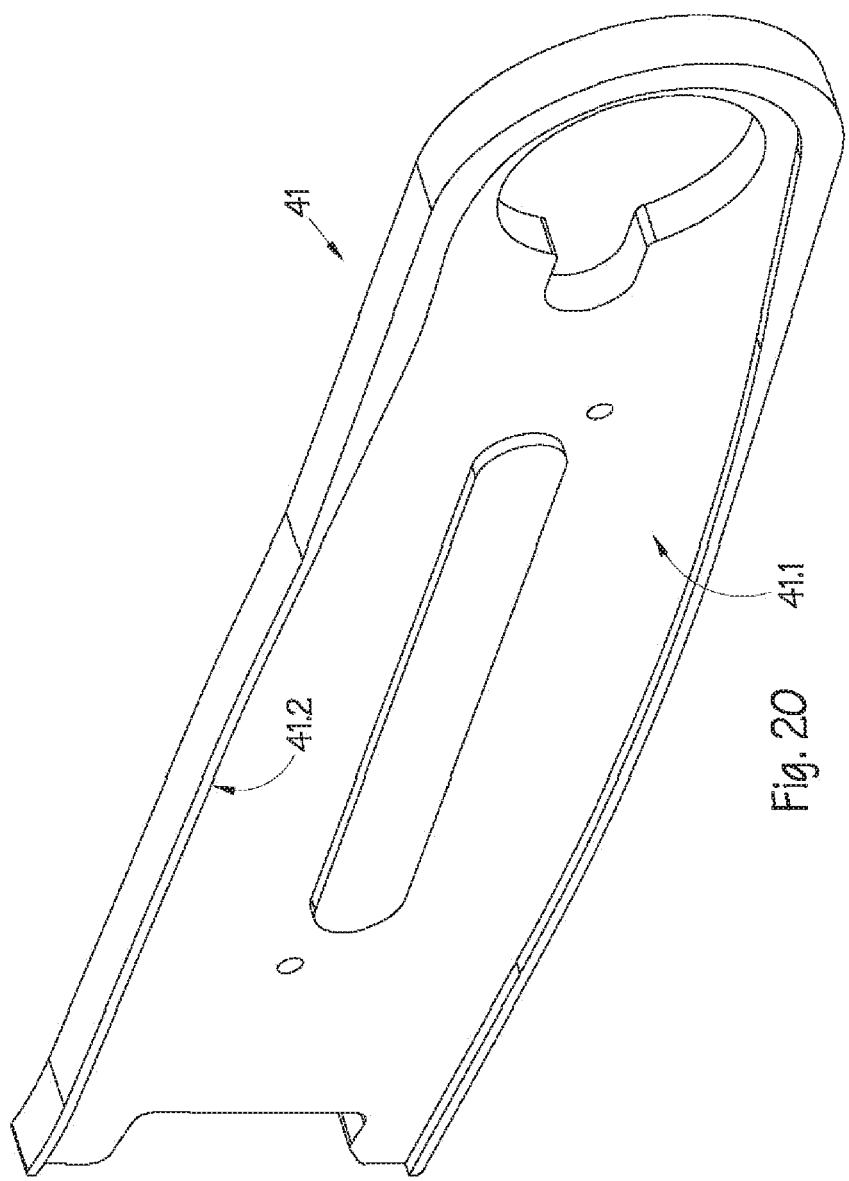

SAUSAGE CUTTING APPARATUS

CROSS-REFERENCES TO RELATED APPLICATIONS

This application is a non-provisional application which claims priority to United Kingdom Application No. GB1704151.8, filed Mar. 15, 2017.

FIELD OF THE INVENTION

This invention relates to a sausage cutting apparatus.

BRIEF SUMMARY OF THE INVENTION

According to the invention there is provided a sausage cutting apparatus including:

a support base defining a feed path along which a sausage to be cut is supported and displaced;

a first cutting assembly located at one side of the feed path, including an elongate continuous carrier member and a plurality of longitudinally-spaced first cutting devices which are fixedly connected to the carrier member, each first cutting device having a cutting blade and an adjacent abutment formation which is spaced therefrom;

a second cutting assembly located at an opposite side of the feed path, including an elongate continuous carrier member and a plurality of longitudinally-spaced second cutting devices which are fixedly connected to the carrier member, each second cutting device having a cutting blade; and a guide system for guiding displacement of the first and second cutting devices along first and second cutter paths, respectively, adjacent the feed path in an arrangement wherein each of the first cutting devices is associated with a particular one of the second cutting devices such that during a cutting operation, the associated first and second cutting devices are initially displaced inwardly towards one another until the cutting blade of the second cutting device is at least partially received within the space defined between the cutting blade and the abutment formation of the first cutting device in a conjugate meshing action so as to sever the sausage and thereafter displaced in a direction away from one another.

The cutting blade of each first cutting device may define an inner side adjacent the abutment formation, an outer side remote from the abutment formation, a proximal end near the carrier member and a distal end remote from the carrier member.

The cutting blade of the first cutting device may define a longitudinal axis extending between the proximal and distal ends of the cutting blade.

The inner side of the cutting blade of the first cutting device may define a convexly curved cutting face. More specifically, the cutting face may have an involute profile.

The cutting blade of the first cutting device may define a V-shaped recess which extends inwardly from the distal end thereof, the recess being configured to receive a side region of a sausage therein.

The cutting blade of each second cutting device may define a proximal end near the carrier member and a distal end remote from the carrier member.

The cutting blade of the second cutting device may define a longitudinal axis extending between the proximal and distal ends of the cutting blade.

The cutting blade of the second cutting device may have an inner side defining a convexly curved cutting face and an outer side. More specifically, the cutting face may have an involute profile.

The cutting faces of the cutting blades of the first and second cutting devices may be configured such that the cutting faces of associated cutting devices mesh with a slight interference fit.

The cutting blade of the second cutting device may define a V-shaped recess which extends inwardly from the distal end thereof, the recess being configured to receive an opposite side region of the sausage therein.

The second cutting device may have an abutment formation which is spaced from the inner side of the cutting blade. More specifically, the first and second cutting devices may have identical configurations.

The first and second cutting devices may be fixedly connected to the carrier members of the first and second cutting assemblies, respectively.

The carrier member of each cutting assembly may be in the form of a continuous flexible toothed belt.

The first and second cutting assemblies may each include a plurality of support formations configured for supporting a sausage when it is cut by the first and second cutting devices.

Each cutting assembly may have at least one support formation connected to the carrier member associated therewith, at a location between two adjacent cutting devices.

Each support formation may define a sloping upper support surface for supporting an underside of the sausage, while it is being cut, the support formation having a proximal end which is connected to the carrier member and a distal end which is remote therefrom, the support surface sloping from the proximal end to the distal end for gradually lifting and lowering the sausage as the support formations are displaced towards and away from one another, respectively, in use.

The guide system may comprise a first guide sub-system for guiding displacement of the first cutting devices along the first cutter path and a second guide sub-system for guiding displacement of the second cutting devices along the second cutter path.

Each guide sub-system may comprise a guide structure extending along the cutter path associated therewith and each cutting device may include a guide formation which engages the guide structure for guided sliding displacement along the guide structure.

The sausage cutting apparatus may include a drive system for synchronously driving the carrier members in an arrangement wherein the associated cutting blades of the first and second cutting devices are sequentially displaced into synchronous meshing engagement with one another for severing the sausage into sausage portions.

Each cutter path may include, in sequence, a blade approach section, a blade meshing section, a blade departure section and a blade return section. The blade approach sections of the first and second cutter paths may converge for displacing the cutting blades of associated first and second cutting devices towards one another. The blade meshing sections of the first and second cutter paths may initially converge for displacing the cutting blades of associated cutting devices into meshing engagement with one another for severing the sausage into sections and thereafter, diverge for displacing the cutting blades out of meshing engagement with one another. More specifically, the blade meshing sections of each cutter path may follow arcuate paths. The blade departure sections of the first and second cutter paths may diverge for displacing the cutting blades of associated first and second cutting devices away from one another. The blade return sections of the first and second cutter paths may be configured for displacing the cutting devices from the blade departure sections to the blade approach sections.

More specifically, the blade departure sections of the cutter paths may be configured so as to provide for displacement of associated cutting blades away from one another until the blades are no longer in contact with the sausage.

The sausage cutting apparatus may include an out-feed system for conveying the cut sausage portions from the feed path after the sausage has been cut into portions. More specifically, the out-feed system may comprise a conveyor belt or a flume.

BRIEF DESCRIPTION OF THE DRAWINGS

Further features of the invention are described hereinafter by way of a non-limiting example of the invention, with reference to and as illustrated in the accompanying diagrammatic drawings. In the drawings:

FIG. 5A shows a schematic top plan view of the cutting assemblies, illustrating sections of the arcuate cutter paths of the cutting devices of the cutting assemblies of FIG. 4;

FIG. 6 shows a three-dimensional view of a bottom side of the cutting assemblies of FIG. 4;

FIG. 7 shows a sectional three-dimensional view of the cutting assemblies of FIG. 4, as seen from above;

FIG. 10 shows a top plan view of the carrier member, cutting devices and support formations of FIG. 9;

FIG. 13 shows a top plan view of the cutting device of FIG. 11;

FIG. 14 shows a sectional front end view of the cutting device of FIG. 11 as sectioned along section line XIV-XIV of FIG. 13;

FIG. 15 shows a top plan view of a pair of cutting devices of the cutting assemblies of FIG. 4, in a fully meshed configuration;

FIG. 20 shows a three-dimensional view of an underside of one of the top cover plates of the sausage cutting apparatus of FIG. 1;

DETAILED DESCRIPTION OF THE INVENTION

Figure 1:
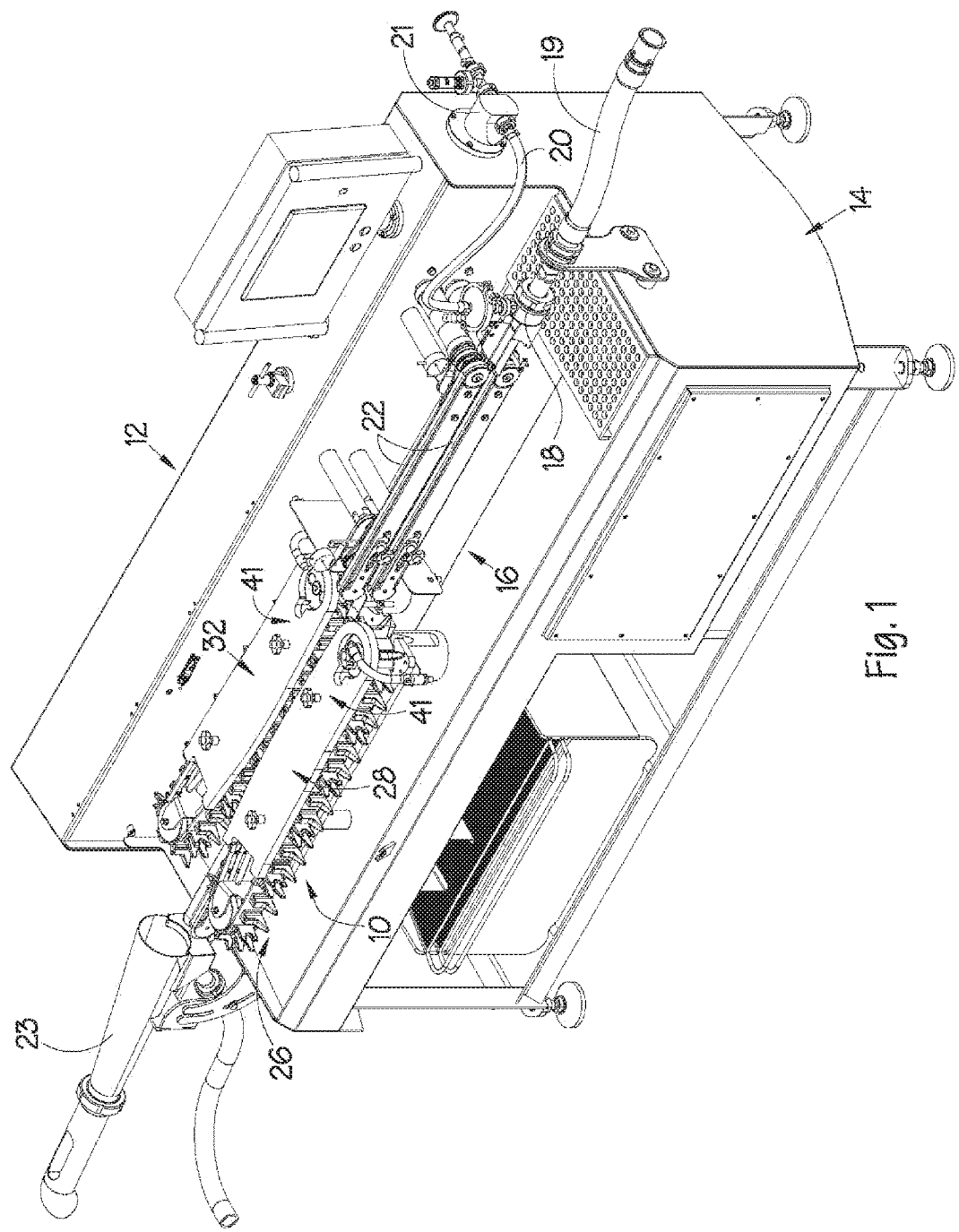
FIG. 1 shows a three-dimensional view of sausage processing equipment including a sausage cutting apparatus in accordance with the invention.
Figure 2:
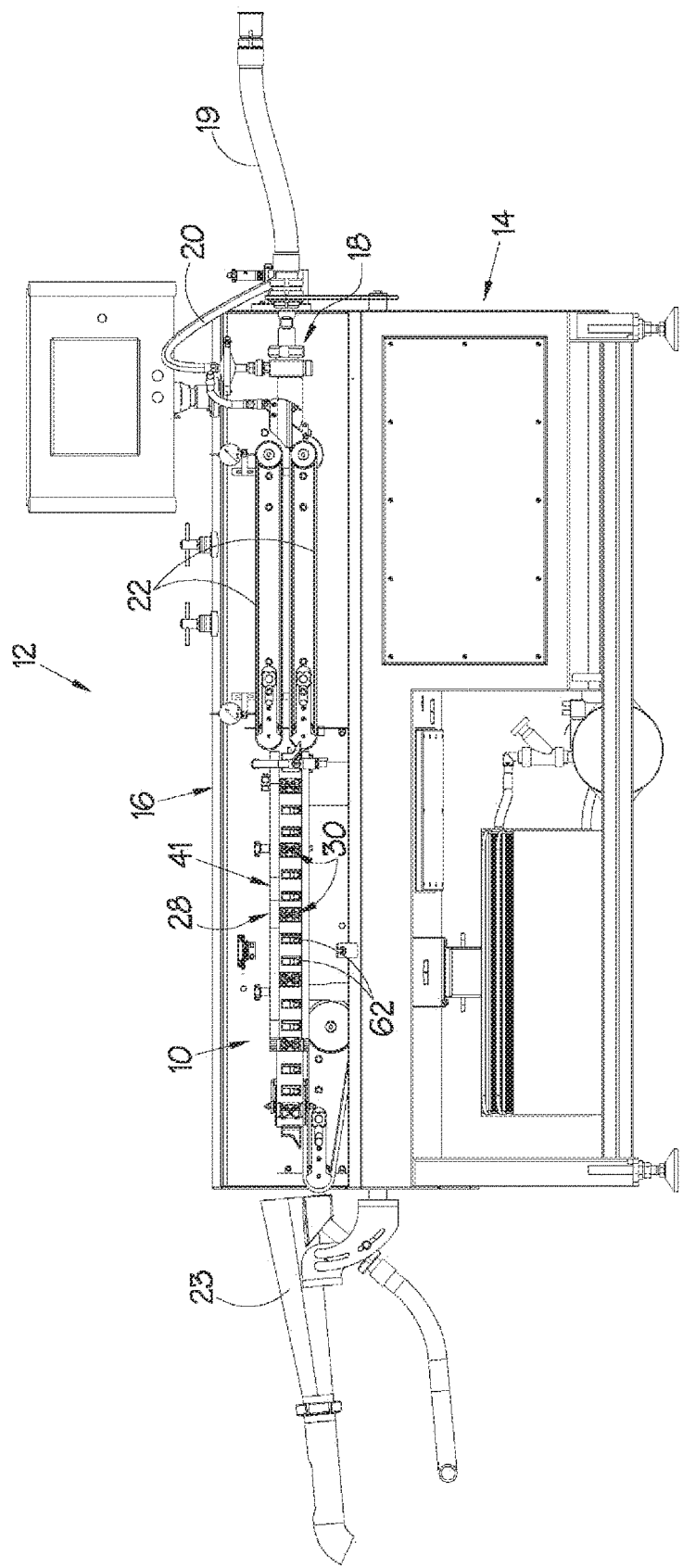
FIG. 2 shows a side view of the sausage processing equipment of FIG. 1.
Figure 3:
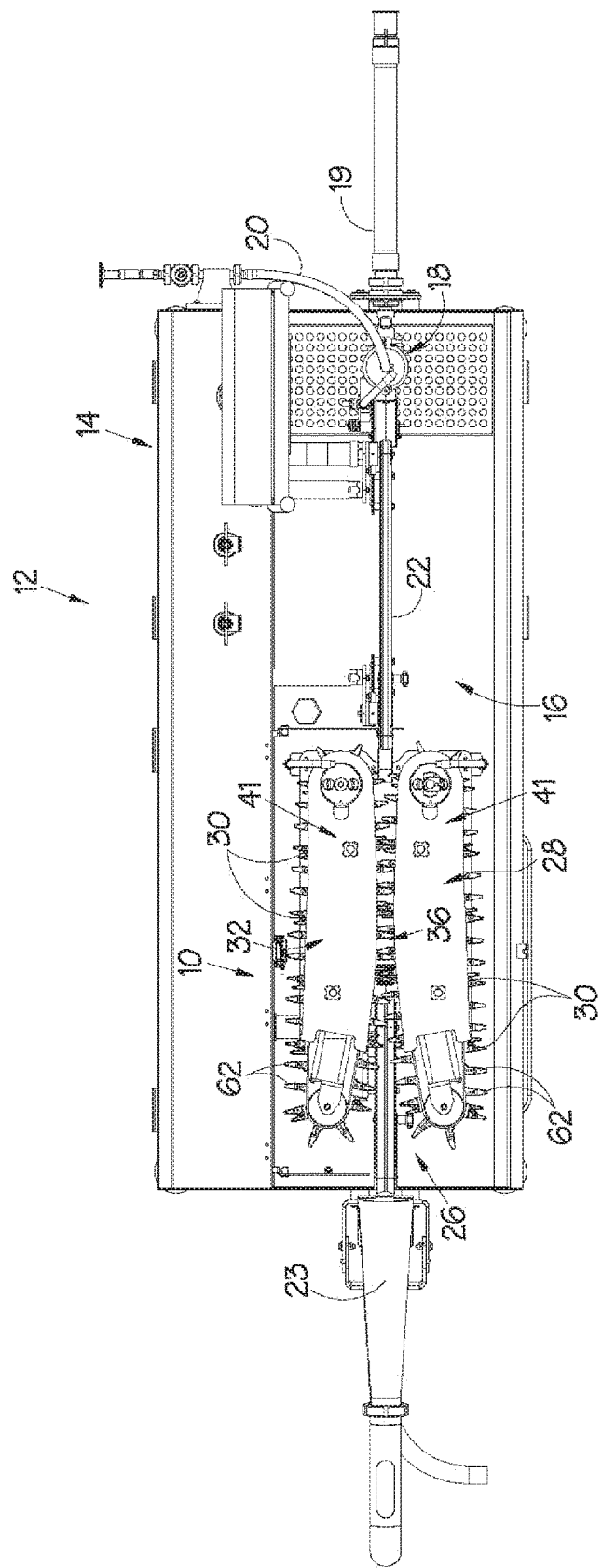
FIG. 3 shows a top plan view of the sausage processing equipment of FIG. 1.
Figure 4:
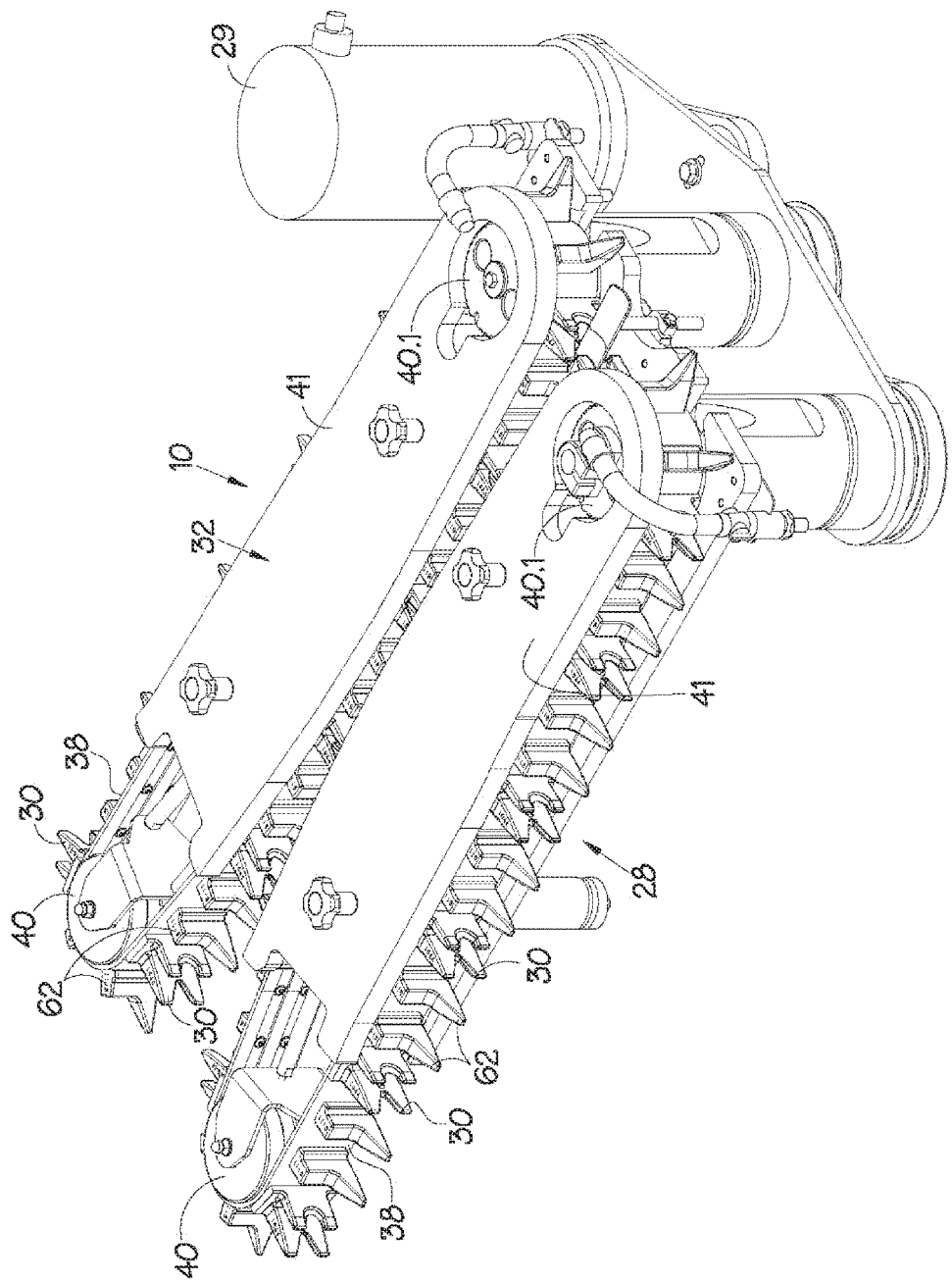
FIG. 4 shows a three-dimensional view of the cutting assemblies of the sausage cutting apparatus of FIG. 1.

With reference to the drawings, a sausage cutting apparatus in accordance with the invention, is designated generally by the reference numeral 10. The sausage cutting apparatus is adapted for severing a sausage which is provided in an elongate continuous form, into separate sausage portions.

The sausage cutting apparatus forms part of sausage processing equipment 12 which includes a stand 14 and a top processing structure 16 mounted on the stand. The processing structure includes an extrusion nozzle 18 for co-extruding a sausage filler emulsion which is fed into the extrusion nozzle via an emulsion feed pipe 19 together with a sausage casing gel composition which is supplied to the extrusion head along gel feed pipe 20. The casing gel composition is initially provided in a flowable form but after extrusion, sets around the filler under the action of a suitable chemical agent to form a sausage casing. A gear pump 21 is provided for pumping the gel composition to the extrusion nozzle. After co-extrusion, a length of the extruded sausage is conveyed along a rectilinear path, where it is supported between sausage support belts 22, towards the sausage cutting apparatus 10 for cutting the extruded length of sausage into smaller portions. The sausage support belts 22 control the speed of travel and tension in the length of sausage. The sausage processing equipment includes a flume 23 for carrying the cut sausage portions to a cooker or other processing equipment.

The sausage cutting apparatus 10 comprises, broadly, a support base 26, a first cutting assembly 28 including a plurality of cutting devices 30, a second cutting assembly 32 including a plurality of cutting devices 30 and a guide system for guiding displacement of the cutting devices during a sausage cutting operation. The cutting devices of the first and second cutting assemblies have identical configurations.

The support base 26 defines a rectilinear feed path 36 between the cutting assemblies along which an extruded length of the sausage to be cut, is supported and slideably displaced.

The first cutting assembly 28 is located at one side of the feed path 36 while the second cutting assembly 32 is located at an opposite side of the feed path with the length of sausage being displaced along the feed path between the first and second cutting assemblies. The first cutting assembly 28 includes an elongate continuous carrier member in the form of a flexible toothed belt 38 to which the cutting devices 30 are fixedly connected in an arrangement wherein the cutting devices are spaced along the length of the belt. More specifically, the cutting devices 30 are fixedly mounted to an external side of the belt 38 by means of screws.

Each of the cutting assemblies has a top cover plate 41, an underside 41.1 of which defines a C-shaped guide rail 41.2 along which the cutting devices are displaced. The sausage cutting apparatus further includes a bottom cover plate 43, the upper side of which defines part of the support base along which the length of sausage and cut sausage portions are displaced. An upper side 43.1 of the bottom cover plate defines a pair of C-shaped guide rails 43.21 and 43.22 along which the cutting devices of the cutting assemblies 28 and 30, respectively, are displaced.

Each cutting device 30 is in the form of a unitary moulded or machined plastics structure comprising a cutting blade 44, an abutment plate 46 which is spaced from the cutting blade and a mounting plate 48. An upper end region of the mounting plate defines a top guide formation in the form of a top guiding lug 49. The mounting plate has two holes 42 in which screws are received for mounting the cutting device to the belt 38. A lower end region of the mounting plate defines a bottom guide formation in the form of a bottom guiding lug 50. The cutting blade 44 has a distal free end 52 and a proximal end 54 at a region where the cutting blade joins the mounting plate 48. The cutting blade defines a longitudinal axis A which extends between the distal and proximal ends of the cutting blade. The cutting blade 44 defines a V-shaped recess 56 in which a side portion of the sausage to be cut, is received. The cutting blade 44 has an inner side adjacent the abutment plate 46 and an outer side removed therefrom, the inner and outer sides being disposed at opposite sides of the longitudinal axis A. The inner side defines a convexly domed cutting face 44.1. The abutment plate 46 has a concave rounded recess 46.1 within which a side region of the sausage is received, the abutment plate acting as a stop which prevents lateral displacement of the sausage during and immediately after the sausage is cut.

Each cutting assembly includes a plurality of support formations 62 fixedly connected to the belt 38 at a location between the cutting device. More specifically, a pair of longitudinally-spaced support formations 62 are located between adjacent spaced cutting devices. Each support formation has a mounting plate 61 for fixedly mounting the support formation to the belt 38 and defines a sloping upper support surface 62.1 for supporting an underside of the sausage, while it is being cut, the support formation having a proximal end 63 which is connected to the carrier member and a distal end 65 which is remote therefrom, the support surface sloping from the proximal end to the distal end for gradually lifting and lowering the sausage as the support formations are displaced towards and away from one another, respectively, in use.

The second cutting assembly 32 is identical to the first cutting assembly 28. The second cutting assembly 32 includes an elongate continuous carrier member in the form of a flexible toothed belt 38 to which the cutting devices 30 are connected in an arrangement wherein the cutting devices are spaced along the length of the belt. The belt 38 has a plurality of teeth defined on an inner side thereof. More specifically, the cutting devices 30 are fixedly mounted to the belt 38 via screws.

The sausage cutting apparatus includes a drive system for synchronously driving the belts 38 of the cutting assemblies 28, 32. The drive system includes a pair of toothed pulleys 40, 40.1 for each cutting assembly for driving the belt 38 of the cutting assembly, and an electrical motor 29 which drives the pulleys 40.1 of both cutting assemblies via a drive belt 41. The drive system synchronously drives the belts 38 in a controlled manner wherein the cutting devices are sequentially displaced into meshing engagement with one another for severing the length of sausage into sausage portions.

Each of the cutting devices of the first cutting assembly is associated with a particular one of the cutting devices of the second cutting assembly, with the cutting blade 44 of each of the associated cutting devices being configured to be received within the space defined between the cutting blade 44 and the abutment plate 46 of the other cutting device. The cutting faces 44.1 of the associated cutting blades 44 slide past one another in a shearing action for cutting the sausage. More specifically, the cutting blades mesh with a slight interference fit in a conjugate meshing action. The shearing action of the cutting blades tends to displace portions of the sausage in opposite directions. As such, the abutment plate 46 of the cutting device 30 resists such lateral forces applied to the sausage such that cut sausage portions continue along a substantially rectilinear feed path after cutting.

The guide system of the sausage cutting apparatus includes the guide rails 41.2 defined on undersides of the top cover plates 41 and the guide rails 43.21 and 43.22 defined on the upper side of the bottom cover plate 43. The guide system further includes the top guiding lug 49 and the bottom guiding lug 50 of each cutting device 30, which slidably engage the top guide rail 41.2 and one of the bottom guide rails 43.21, 43.22. as such, the top and bottom guiding lugs 49, 50 are slidably retained between the underside 41.1 and the upper side 43.1 of the top and bottom cover plates for guided displacement between the cover plates along the guide rails.

The displacement of the belts 38 of the first and second cutting assemblies is synchronised such that each cutting device 30 of the first cutting assembly is associated with a corresponding cutting device 30 of the second cutting assembly in an arrangement wherein, during a cutting operation, associated cutting devices 30 are initially displaced inwardly towards one another for cutting the sausage 12 between them. More specifically, the associated cutting devices are displaced towards one another until the cutting blade 48 of a particular one of the cutting devices 34 is received within the space defined between the cutting blade 44 and the abutment plate 46 of the cutting device 30 associated therewith, thereby severing the sausage in a shearing action as explained hereinabove.

Figure 5:
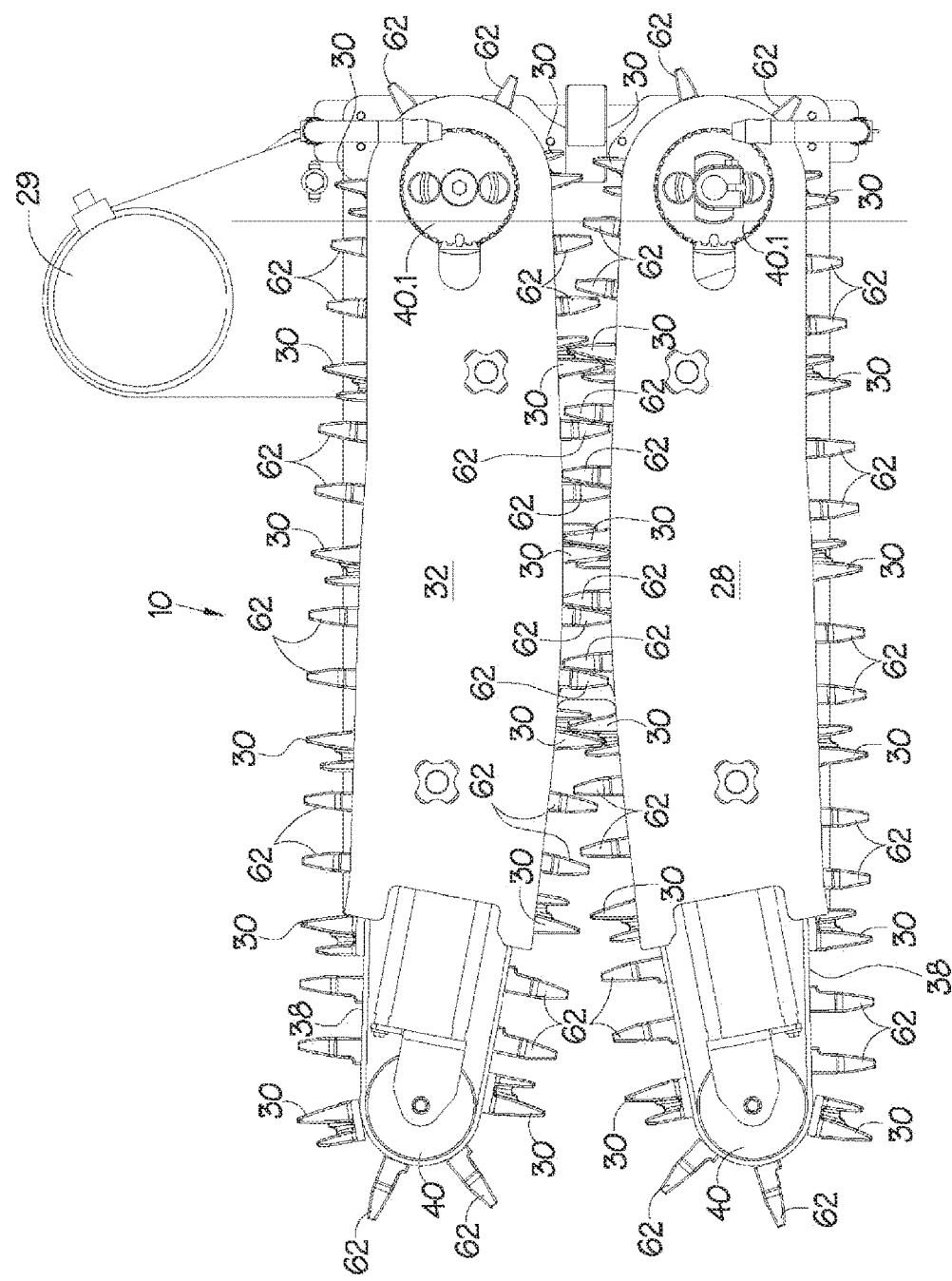
FIG. 5 shows a top plan view of the cutting assemblies of FIG. 4.
Figure 8:
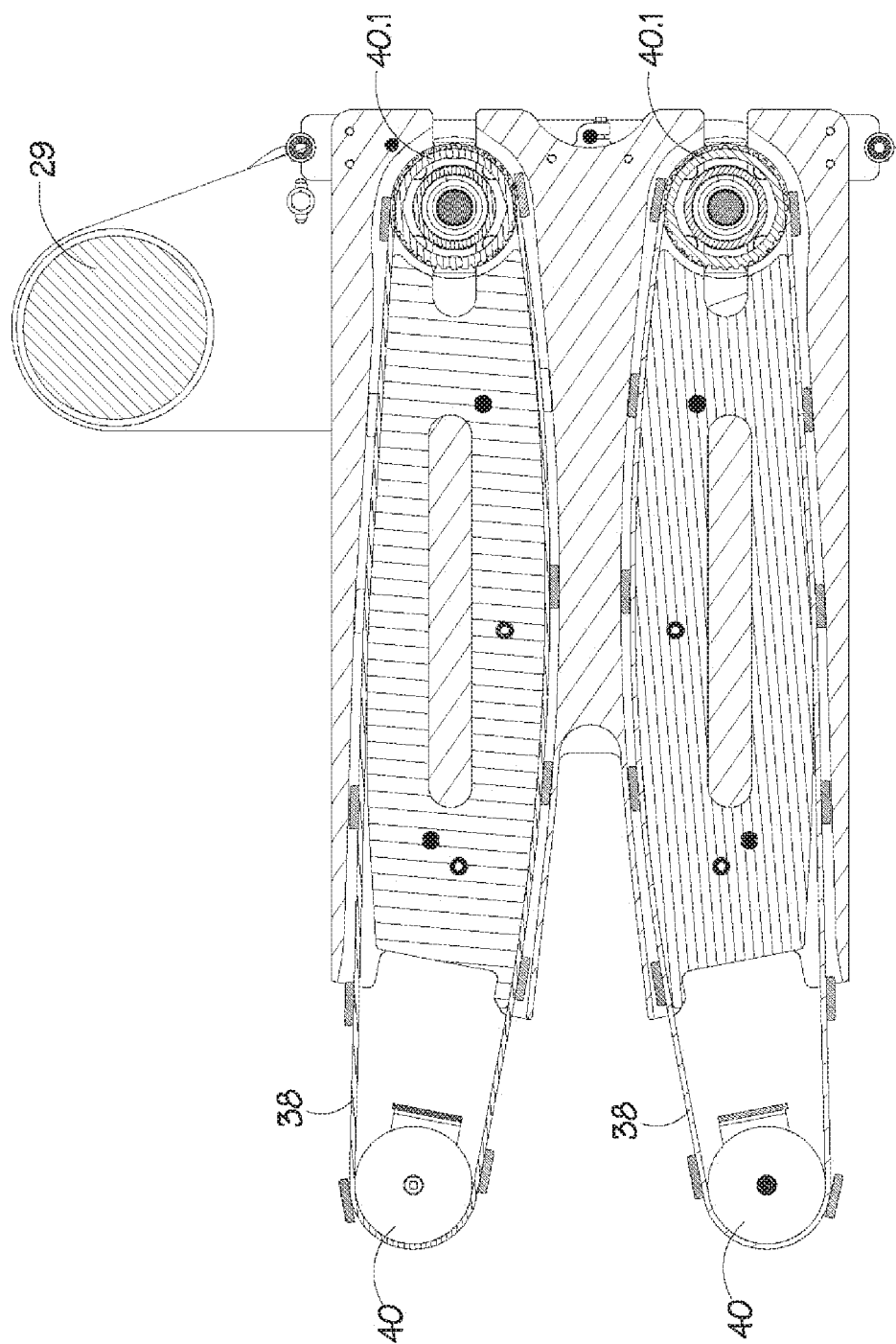
FIG. 8 shows a sectional plan view of the cutting assemblies of FIG. 4, as seen from above.
Figure 9:
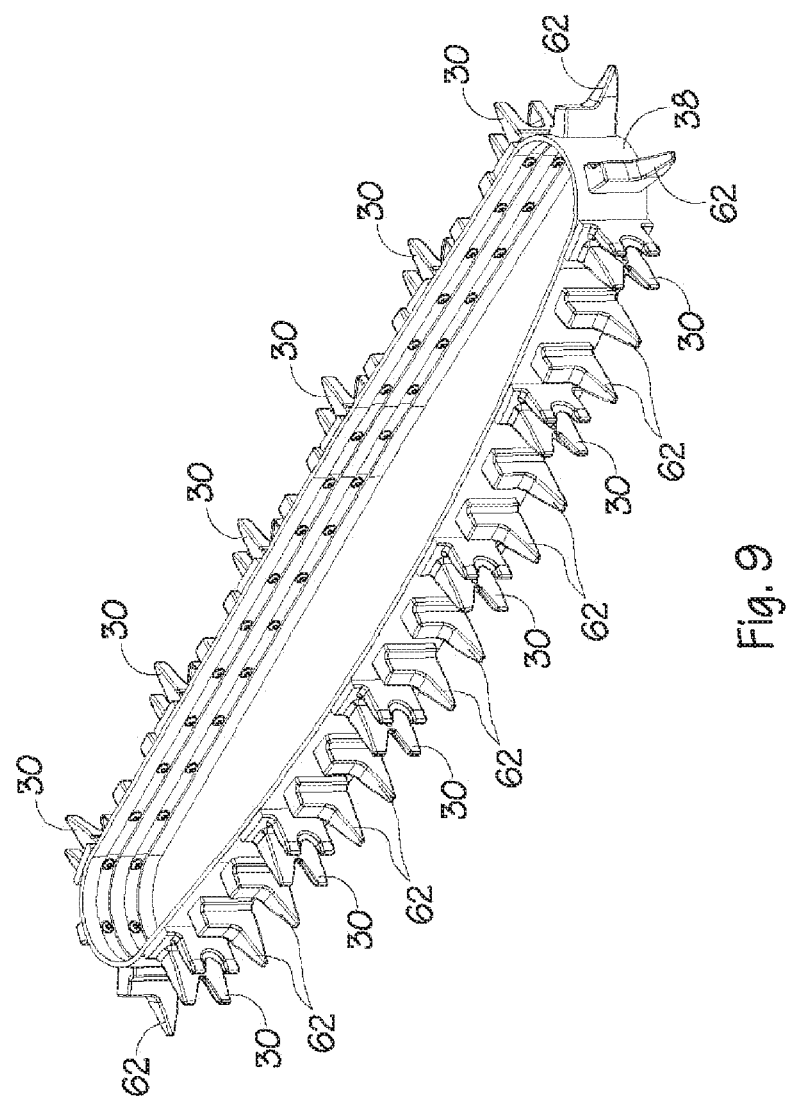
FIG. 9 shows a three-dimensional view of a carrier member of one of the cutting assemblies of FIG. 4 with the cutting devices and support formations connected thereto.
Figure 12:
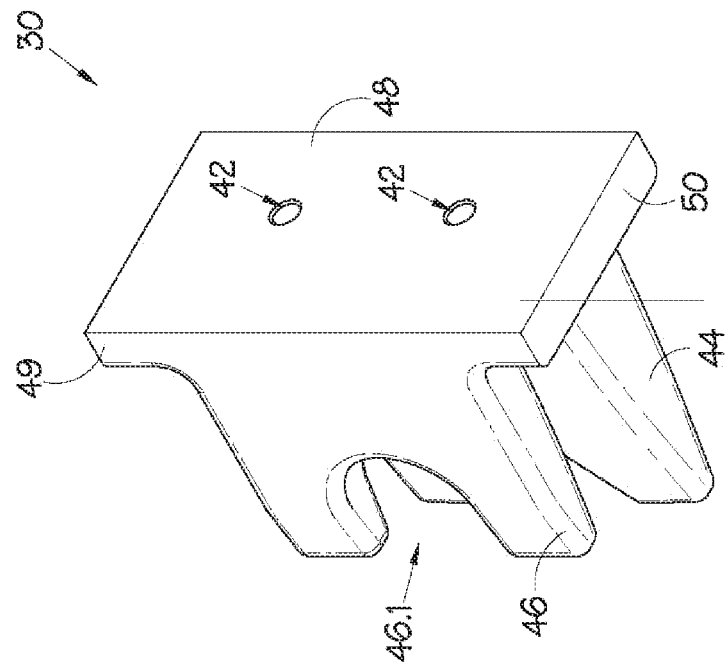
FIG. 12 shows a three-dimensional view of the cutting device of FIG. 11 as seen from a rear side thereof.
Figure 11:
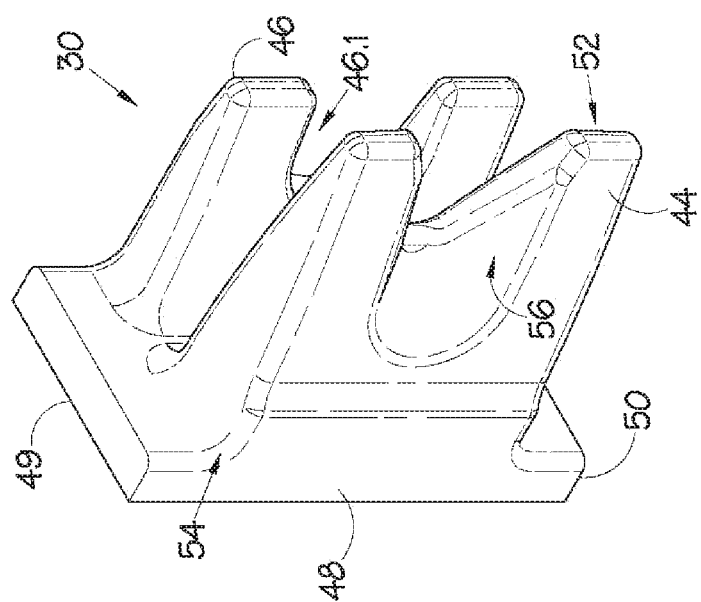
FIG. 11 shows a three-dimensional view of a cutting device of one of the cutting assemblies of the cutting assemblies of FIG. 4, as seen from a front side thereof.
Figure 17:
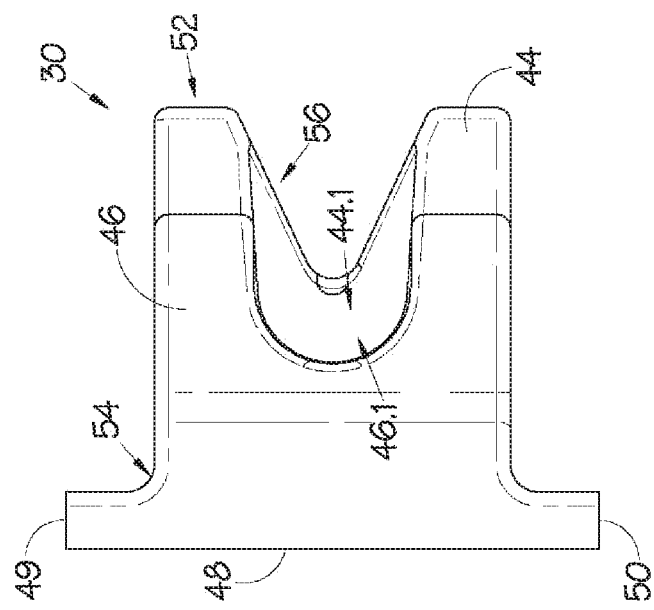
FIG. 17 shows a side view of the cutting device of FIG. 11.
Figure 16:
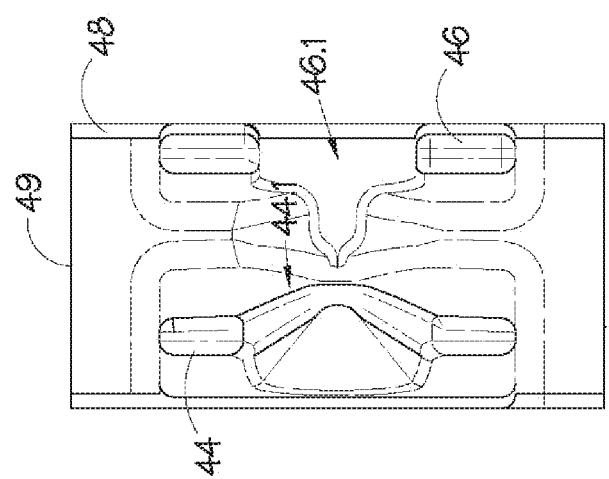
FIG. 16 shows a front end view of the cutting device of FIG. 11.
Figure 19:
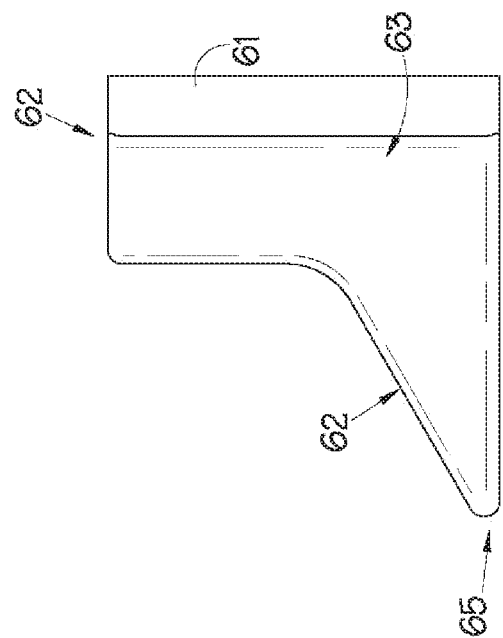
FIG. 19 shows a side view of a support formation of a particular one of the cutting assemblies of FIG. 4.
Figure 18:
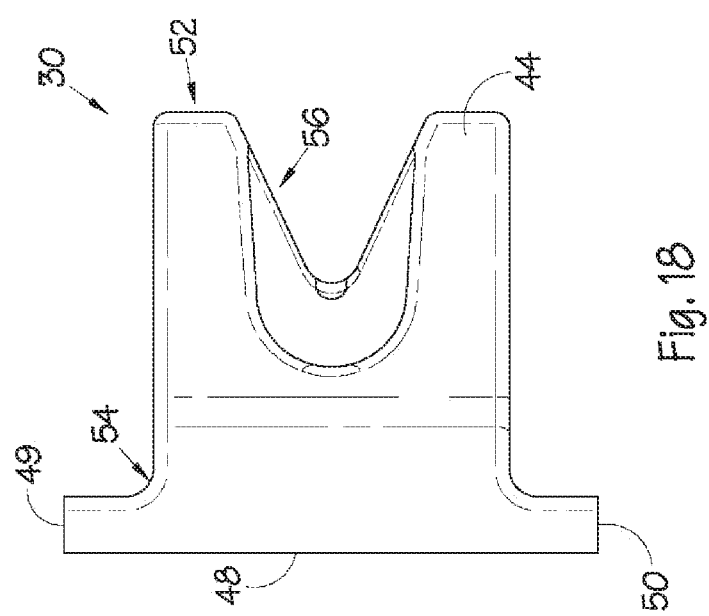
FIG. 18 shows an opposite side view of the cutting device of FIG. 11.
Figure 21:
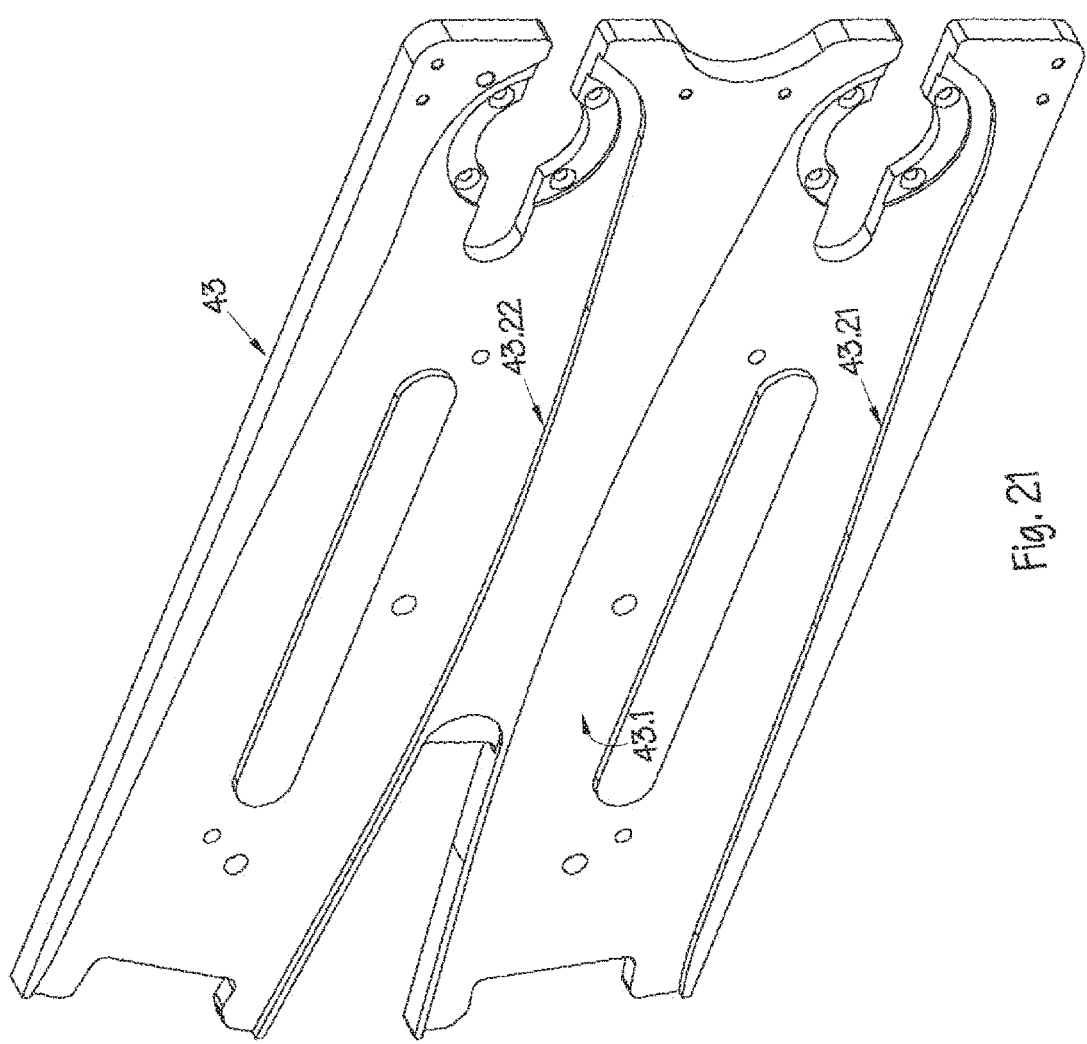
FIG. 21 shows a three-dimensional view of an upper side of the bottom cover plate of the sausage cutting apparatus of FIG. 1.
Figure 22:
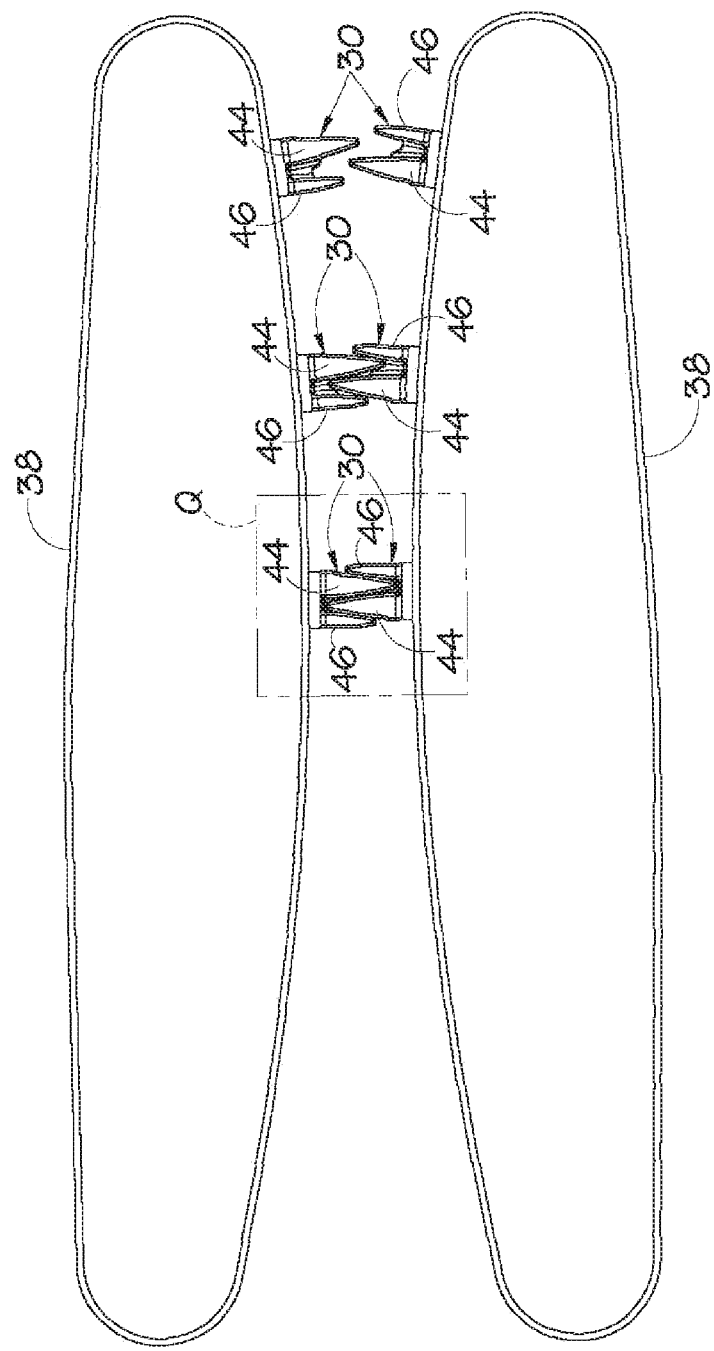
FIG. 22 shows a top plan view of the toothed belts of the cutting assemblies of FIG. 4, illustrating the meshing action of the cutting devices.
Figure 23:
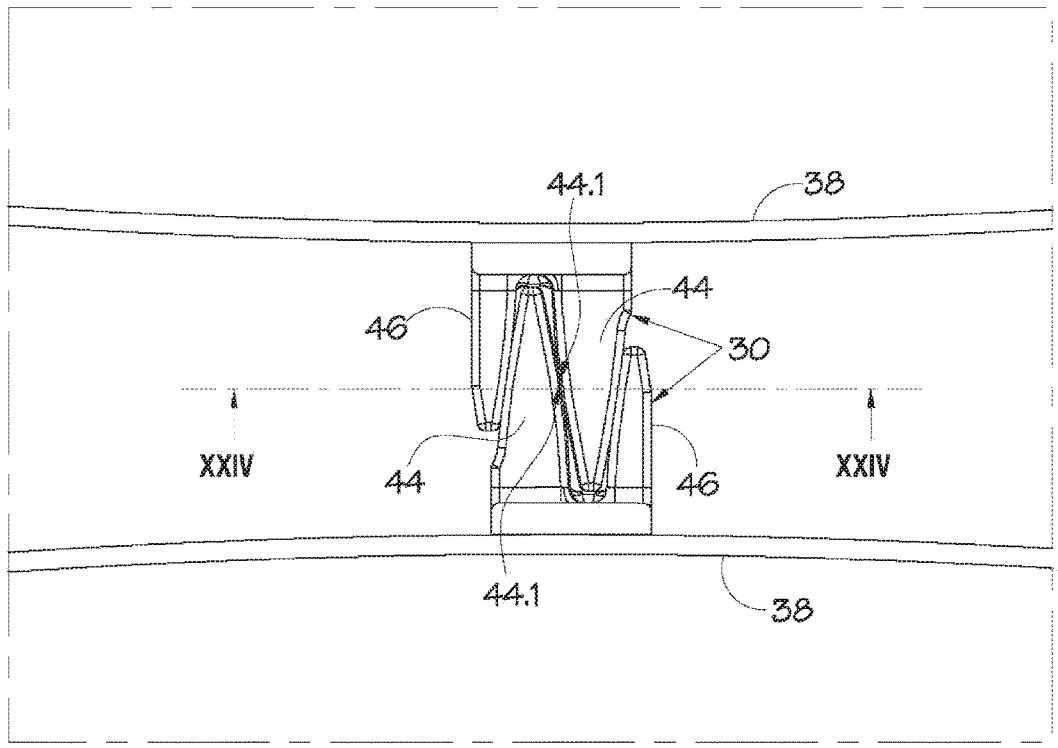
FIG. 23 shows enlarged detail Q of FIG. 22, illustrating a pair of fully meshed cutting devices.
Figure 24:
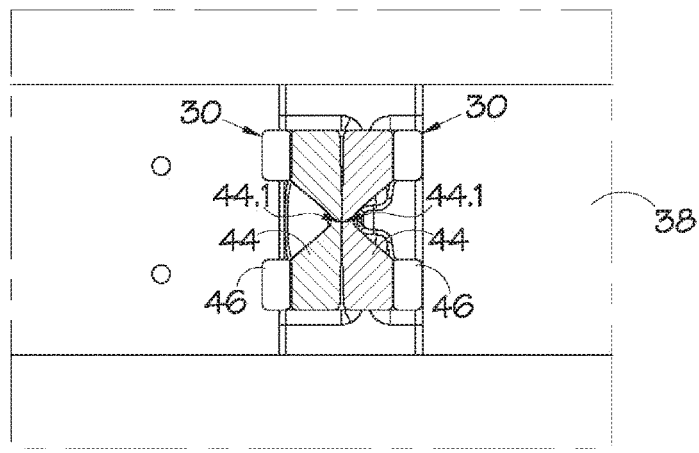
FIG. 24 shows a sectional end view of the meshed cutting devices of FIG. 23, sectioned along section line XXIV-XXIV of FIG. 23.

The guide system is operable to guide displacement of the cutting devices of each cutting assembly, along predetermined continuous cutter paths. With specific reference to FIG. 5A, each cutter path includes, in sequence, a blade approach section (A), a blade meshing section (M) and a blade departure section (D). In addition, each cutter path includes a blade return section (R). The blade approach sections (A) of the first and second cutter paths converge for displacing the cutting blades of associated first and second cutting devices towards one another. The blade meshing sections (M) of the first and second cutter paths follow arcuate paths of travel, initially converging for displacing the cutting blades of associated cutting devices into meshing engagement with one another for severing the sausage into sections and thereafter, diverging for displacing the cutting blades out of meshing engagement with one another. The blade departure sections (D) of the first and second cutter paths diverge for displacing the cutting blades of associated first and second cutting devices away from one another. The blade return sections (R) of the first and second cutter paths are configured for displacing the cutting devices from the blade departure sections to the blade approach sections.

The blade meshing sections of the cutter paths are configured such that the arcuate paths thereof have a greater radius of curvature that a radius of a path of travel of the cutting blades around the pulleys 40, 40.1. As such, all cutting occurs along the blade meshing sections which provide for gradual engagement and complete disengagement of the cutting blades prior to the cutting blades travelling around the paths, having smaller radii, of the pulleys 40, 40.1. In this manner, damage to the sausage due to a change in the angular orientation of the cutting blades relative to one another due to the cutting blades travelling around a pulley while still in contact with the sausage, is obviated.

The cutter paths of travel of the belts 38 and the configuration of the cutting devices 30 wherein the cutting blades 44 of associated cutting devices 30 are received within spaces defined therefor between the cutting blades 44 and the abutment plates 46 of associated cutting devices, provide for accurate alignment and intersection of the cutting blades. The domed cutting faces 44.1 of the cutting blades 44 have apices in central regions of the cutting faces thereby ensuring contact between the cutting faces of meshing cutting blades at the apices of the cutting faces. When viewed in horizontal or vertical planes, the cutting face 44.1 of each cutting blade defines a convexly curved, domed surface. When viewed in horizontal section, the domed cutting face has an involute profile. When viewed in vertical section, the domed cutting face defines a camber curve.

The arcuate paths of the meshing sections of the cutter paths of the cutting assemblies provide for the conjugate meshing action which results in effective cutting of a sausage into sections. In order to achieve the accurate alignment and intersection of the cutting blades, the cutting blades are fixedly connected to the belts 38. Prior art sausage cutting machines do not provide arcuate cutting paths during meshing of the cutting blades as described hereinabove and for this reason, the cutting blades of such prior art sausage cutting machines are pivotally mounted to continuous belt-type carrier members and the path of travel of the cutting blades typically controlled by means of cams or the like. In many instances, the sausage is damaged as the cutting blades of such prior art sausage cutting machines remain in contact with the sausage as the cutting blades travel around the relatively smaller radii of pulleys on which the carrier members are displaceably mounted. Such damage is obviated in the case of the sausage cutting apparatus in accordance with the present invention, due to the configuration of the arcuate meshing sections of the cutter paths resulting in accurate alignment of the fixedly connected cutting blades thereof when travelling along arcuate cutting paths when associated cutting blades mesh with one another in the conjugate meshing action described above.

What is claimed is:

1. A sausage cutting apparatus including:
   a support base defining a feed path along which a sausage to be cut is supported and displaced;
   a first cutting assembly located at one side of the feed path, including an elongate continuous carrier member and a plurality of longitudinally-spaced first cutting devices which are fixedly connected to the carrier member, each first cutting device having a cutting blade and an adjacent abutment formation which is spaced therefrom;
   a second cutting assembly located at an opposite side of the feed path, including an elongate continuous carrier member and a plurality of longitudinally-spaced second cutting devices which are fixedly connected to the carrier member, each second cutting device having a cutting blade; and
   a guide system for guiding displacement of the first and second cutting devices along first and second cutter paths, respectively, adjacent the feed path in an arrangement wherein each of the first cutting devices is associated with a particular one of the second cutting devices such that during a cutting operation, the associated first and second cutting devices are initially displaced inwardly towards one another until the cutting blade of the second cutting device is at least partially received within the space defined between the cutting blade and the abutment formation of the first cutting device in a conjugate meshing action so as to sever the sausage and thereafter displaced in a direction away from one another.

2. The sausage cutting apparatus as claimed in claim 1, wherein the cutting blade of each first cutting device defines an inner side adjacent the abutment formation, an outer side remote from the abutment formation, a proximal end near the carrier member and a distal end remote from the carrier member.

3. The sausage cutting apparatus as claimed in claim 2, wherein the cutting blade of the first cutting device defines a longitudinal axis extending between the proximal and distal ends of the cutting blade.

4. The sausage cutting apparatus as claimed in claim 2, wherein the inner side of the cutting blade of the first cutting device defines a convexly curved cutting face.

5. The sausage cutting apparatus as claimed in claim 4, wherein the cutting face has an involute profile.

6. The sausage cutting apparatus as claimed in claim 4, wherein the cutting face has a domed configuration defining a central apex.

7. The sausage cutting apparatus as claimed in claim 1, wherein the cutting blade of the first cutting device defines a V-shaped recess which extends inwardly from the distal end thereof, the recess being configured to receive a side region of a sausage therein.

8. The sausage cutting apparatus as claimed in claim 7, wherein the cutting blade of the second cutting device has an inner side defining a convexly curved cutting face and an outer side.

9. The sausage cutting apparatus as claimed in claim 8, wherein the cutting face has an involute profile.

10. The sausage cutting apparatus as claimed in claim 8, wherein the cutting face of the second cutting device has a domed configuration defining a central apex.

11. The sausage cutting apparatus as claimed in claim 6 and claim 10, wherein the cutting faces of the cutting blades of the first and second cutting devices are configured such that the cutting faces of associated cutting devices mesh with a slight interference fit.

12. The sausage cutting apparatus as claimed in claim 11, wherein the cutting faces of associated cutting devices contact one another in a region of the apices thereof.

13. The sausage cutting apparatus as claimed in claim 8, wherein the second cutting device has an abutment formation which is spaced from the inner side of the cutting blade.

14. The sausage cutting apparatus as claimed in claim 1, wherein the cutting blade of each second cutting device defines a proximal end near the carrier member and a distal end remote from the carrier member.

15. The sausage cutting apparatus as claimed in claim 14, wherein the cutting blade of the second cutting device defines a longitudinal axis extending between the proximal and distal ends of the cutting blade.

16. The sausage cutting apparatus as claimed in claim 14, wherein the cutting blade of the second cutting device defines a V-shaped recess which extends inwardly from the distal end thereof, the recess being configured to receive an opposite side region of the sausage therein.

17. The sausage cutting apparatus as claimed in claim 1, wherein the first and second cutting devices have identical configurations.

18. The sausage cutting apparatus as claimed in claim 1, wherein the first and second cutting devices are fixedly connected to the carrier members of the first and second cutting assemblies, respectively.

19. The sausage cutting apparatus as claimed in claim 1, wherein the carrier member of each cutting assembly is in the form of a continuous flexible toothed belt.

20. The sausage cutting apparatus as claimed in claim 1, wherein the first and second cutting assemblies each include a plurality of support formations configured for supporting a sausage when it is cut by the first and second cutting devices.

21. The sausage cutting apparatus as claimed in claim 20, wherein each cutting assembly has at least one support formation connected to the carrier member associated therewith, at a location between two adjacent cutting devices.

22. The sausage cutting apparatus as claimed in claim 21, wherein each support formation defines a sloping upper support surface for supporting an underside of the sausage, while it is being cut, the support formation having a proximal end which is connected to the carrier member and a distal end which is remote therefrom, the support surface sloping from the proximal end to the distal end for gradually lifting and lowering the sausage as the support formations are displaced towards and away from one another, respectively, in use.

23. The sausage cutting apparatus as claimed in claim 1, wherein the guide system comprises a first guide sub-system for guiding displacement of the first cutting devices along the first cutter path and a second guide sub-system for guiding displacement of the second cutting devices along the second cutter path.

24. The sausage cutting apparatus as claimed in claim 23, wherein each guide sub-system comprises a guide structure extending along the cutter path associated therewith and each cutting device may include a guide formation which engages the guide structure for guided sliding displacement along the guide structure.

25. The sausage cutting apparatus as claimed in claim 1, wherein the sausage cutting apparatus includes a drive system for synchronously driving the carrier members in an arrangement wherein the associated cutting blades of the first and second cutting devices are sequentially displaced into synchronous meshing engagement with one another for severing the sausage into sausage portions.

26. The sausage cutting apparatus as claimed in claim 1, wherein each cutter path includes, in sequence, a blade approach section, a blade meshing section and a blade departure section.

27. The sausage cutting apparatus as claimed in claim 26, wherein the blade approach sections of the first and second cutter paths converge for displacing the cutting blades of associated first and second cutting devices towards one another.

28. The sausage cutting apparatus as claimed in claim 26, wherein the blade meshing sections of the first and second cutter paths initially converge for displacing the cutting blades of associated cutting devices into meshing engagement with one another for severing the sausage into sections and thereafter, diverge for displacing the cutting blades out of meshing engagement with one another.

29. The sausage cutting apparatus as claimed in claim 26, wherein the blade departure sections of the first and second cutter paths diverge for displacing the cutting blades of associated first and second cutting devices away from one another.

30. The sausage cutting apparatus as claimed in claim 26, wherein each cutter path includes a blade return section configured for displacing the cutting device from the blade departure section to the blade approach section of the cutter path.

31. The sausage cutting apparatus as claimed in claim 29, wherein the blade departure sections of the cutter paths are configured so as to provide for displacement of associated cutting blades away from one another until the blades are no longer in contact with the sausage.

32. The sausage cutting apparatus as claimed in claim 1, wherein the sausage cutting apparatus includes an out-feed system for conveying the cut sausage portions from the feed path after the sausage has been cut into portions.

* * * * *